United States Patent Office 3,320,090
Patented May 16, 1967

---

3,320,090
PHENOXY-POLYURETHANE MAGNETIC TAPE BINDER
Lawrence Graubart, Daly City, Calif., assignor to Ampex Corporation, Redwood City, Calif., a corporation of California
No Drawing. Filed July 30, 1964, Ser. No. 386,427
5 Claims. (Cl. 117—161)

This invention relates to a novel binder system for use in magnetic recording media wherein a backing material, which may be in the form of a tape, belt, disc or the like, is provided with a synthetic resin binder having finely divided magnetic particles dispersed in the binder. Normally, the backing material is a plastic, although other materials such as paper, glass or metal can be used.

Tape recorders and reproducers which are in use at the present time, such as the moving head type used in video recording, as well as high speed transports used in data recording, impose severe bending and abrasion stresses on magnetic tape so that the useful life of the tape is limited.

Further, many resin systems which have been proposed for use as tape binders are difficult to handle in the plant and frequently have short pot life, so that it is necessary to prepare the resin and binder system and apply it to the tape immediately.

An additional problem is that some of the binders, particularly those used in thermoset coatings, have a relatively low molecular weight so that a long curing time must ensue after the tape is coated before it can be spooled or otherwise processed.

Another difficulty with tape formulations in the past has been that they are not equally effective with all plastic supports, so that special precautions must be taken with certain of the supports, particularly polypropylene film.

In accordance with the present invention, a novel binder system is provided for magnetic tape which, in its broadest form, can be used to form a thermoplastic system wherein the resin components are extremely stable during processing, particularly with respect to heat or contact with metal. The thermoplastic solution is easy to prepare and apply and gives good flexibility of the coated tape and strongly adheres to known plastic bases.

In accordance with one embodiment of the invention, a third component can be added to the thermoplastic mixture, rendering it thermosetting. The thermoset system utilizes materials having a high initial molecular weight so that the tape may be wound immediately upon exit from the usual solvent evaporating oven without fear of layer-to-layer blocking. Further, the tape may be immediately processed, such as by slitting, without waiting for the final curing action to take place. Curing can be accomplished while the tape is rolled up by placing it in a warm room or oven at 70–80° C. for 16 to 24 hours. The final thermoset coating becomes extremely hard and is resistant to solvents, chemicals, heat and moisture, yet it still retains flexibility and adhesion.

In accordance with the broadest aspect of this invention, a thermoplastic system is prepared containing two high molecular weight resins. The first of these is a high molecular weight epoxy resin reaction product known as a phenoxy resin. Suitable phenoxy resins have the following molecular structure:

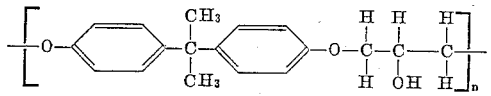

wherein $n$ is approximately 100. A particularly suitable resin is that sold by Union Carbide & Chemicals Corporation as phenoxy resin PRDA–8080 and having the following characteristics:

| | |
|---|---|
| Approximate molecular weight | 20,000–30,000. |
| Specific gravity | 1.18. |
| Melt flow (g./10 minutes at 220° C.) | 2.5–10. |
| Ultimate tensile strength, p.s.i. | 9,000–9,500. |
| Ultimate tensile elongation, percent | 50–100. |
| Softening temperature | 100° C. |
| Moisture vapor transmission | 3.5 gms./mil./24 hrs./100 in.$^2$. |

The second component is an elastomeric polyurethane resin made by reacting a diisocyanate such as 2,4-toluene diisocyanate, hexamethylene diisocyanate or p,p'-diphenylmethane diisocyanate with a dibasic acid such as adipic or phthalic acids and a polyhydroxy alcohol such as glycerin, hexanetriol, and butanediol. One particularly suitable polyurethane is made by reacting p,p'-diphenylmethane diisocyanate, adipic acid and butanediol-1,4 in such proportions that all of the isocyanate groups have reacted to give a substantially unreactive polymer. Such resins are sold by B. F. Goodrich under the trade names of Estane 5740 X–1 and X–2, which have the following characteristics:

| | X–1 | X–2 |
|---|---|---|
| Specific gravity | 1.21 | 1.19 |
| Hardness (Durometer A) | 88 | 65 |
| Tensile strength at 73.4° F. (p.s.i.) | 5,840 | 5,000 |
| 300% modulus at 73.4° F. (p.s.i.) | 1,240 | 420 |
| Taber abrasion resistance (gram loss—CS17 wheel, 1000 gr./wheel 500 rev.) | 0.0025 | 0.15 |

The phenoxy-polyurethane resin ratio, on a resin solids basis, can vary from about 75% phenoxy resin to 25% polyurethane resin to about 25% phenoxy resin to 75% polyurethane resin. Preferably about equal parts are used. The final non-volatile coating composition will contain on a solids basis about 75% of a magnetic pigment with the balance being the resinous binder described.

In formulating practical tapes, ingredients other than the resin binder and the magnetic oxide particles would be employed, as is well known to those skilled in the art. Thus, an anti-static compound such as carbon black might be added; fungicides such as phenyl mercuric oleate, dispersants such as lecithin and lubricants such as the silicones may be employed also. Further, various solvents are used to disperse the various solid ingredients and act as solvents for the resin components. Normally, a dispersion is made up of magnetic gamma ferric oxide, carbon black and solvents, as well as any additives as discussed above. A separate resin solution is prepared and the solution is added to the dispersion and mixed, as in a ball mill, for from 6 to 36 hours. The final dispersion thus produced is then applied to a plastic backing material, typically Mylar (polyethylene terephthalate), cellulose acetate, polypropylene or the like.

The following non-limiting examples show various methods of formulating thermoplastic coating compositions:

| Dispersion, parts by weight | Example | | | |
|---|---|---|---|---|
| | 1 | 2 | 3 | 4 |
| Magnetic oxide | 54.5 | 54.0 | 55.2 | 52.5 |
| Carbon black | 3.4 | 4.3 | 2.1 | 4.1 |
| Additives* | 3.3 | 2.9 | 1.8 | 4.8 |
| Methyl ethyl ketone | 8.2 | 8.1 | 8.5 | 2.2 |
| Toluol | 17.4 | 15.6 | 18.5 | 12.6 |
| Methyl isobutyl ketone | 13.2 | 15.1 | 13.9 | 23.8 |
| | 100.0 | 100.0 | 100.0 | 100.0 |

*Additives included lecithin, silicon oil and phenyl mercuric oleate.

Resin solutions to be added to above dispersions:

| Parts per hundred dispersion | 50.0 | 50.0 | 46.0 | 56.0 |
|---|---|---|---|---|
| Phenoxy PRDA-8080 | 8.6 | 15.9 | 10.5 | 11.0 |
| Estane X-2 | 12.9 | 5.2 | 10.5 | |
| Estane X-1 | | | | 11.0 |
| Methylethyl ketone | 38.1 | 38.8 | 40.3 | 10.5 |
| Methyl isobutyl ketone | 12.8 | 6.4 | 7.6 | |
| Toluol | 16.4 | 20.8 | 17.7 | |
| N-butyl alcohol | 11.2 | 12.9 | 13.4 | |
| Tetrahydrofuran | | | | 67.5 |
| | 100.0 | 100.0 | 100.0 | 100.0 |
| Phenoxy/polyurethane, wgt | 40/60 | 75/25 | 50/50 | 50/50 |
| Viscosity resin solution, 77° F. (cps) | 800 | 450 | 625 | |
| Viscosity total formula, 77° F. (cps) | 3,500 | 2,800 | 2,000 | 3,700 |

Coatings Nos. 1 and 2 were applied to a cellulose acetate backing, while coating No. 3 was applied to a Mylar backing and coatnig No. 4 was applied to a propylpropylene backing, in each case using a knife coater.

The wet coating was dried in a three-zone oven at 175° F. for the first zone and 225° F. for the second and third zones. The coating speed was 120 feet per minute and the total residence time in the oven was 35–40 seconds. The coated films were wound immediately upon leaving the oven and were later tested for adhesion and magnetic properties and found to be satisfactory.

If one desires to make atape having a thermoset binder in accordance with preferred embodiments of the invention, the above formulations can be modified by adding thereto a melamine-formaldehyde resin or a urea-formaldehyde resin.

A suitable melamine-formaldehyde resin can be prepared by reacting together 5 to 6 mols of formaldehyde with one mole of melamine and one to two moles of butanol per mole of melamine. A particularly suitable resin is sold under the name of Super-Beckamine 3550-50 by Reichold Chemicals and has the following properties:

Non-volatile _____ 50%.
Volatiles _____ Xylol-butanol.
Viscosity _____ L-P (Gardner-Holdt).
Acid number _____ 2 maximum.

A suitable urea-formaldehyde resin can be made by reacting one mol of urea with two moles of formaldehyde and one mol of butanol. One such resin is sold by Reichhold under the name Beckamine P196-60. This resin has the following properties:

Non-volatile _____ 58-62%.
Volatiles _____ Butanol-ethanol.
Viscosity _____ K-M (Gardner-Holdt).
Acid number _____ 2 maximum.

The amount of the formaldehyde resin which is added can be varied to up to 30% of the phenoxy resin content. Preferably at least 10% is employed. The following are typical working examples of thermoset resins prepared in accordance with the present invention:

| Dispersion, parts by weight | Example | | | |
|---|---|---|---|---|
| | 5 | 6 | 7 | 8 |
| Magnetic oxide | 54.0 | 53.5 | 54.5 | 54.0 |
| Carbon black | 4.2 | 4.2 | 3.4 | 4.3 |
| Additives | 3.5 | 3.4 | 3.5 | 2.9 |
| Methyl ethyl ketone | 8.1 | 8.0 | 8.2 | 8.1 |
| Methyl isobutyl ketone | 12.9 | 12.8 | 13.0 | 15.1 |
| Toluol | 17.3 | 18.1 | 17.4 | 15.6 |
| | 100.0 | 100.0 | 100.0 | 100.0 |

Resin solutions to be added to above dispersions:

| Parts per hundred dispersion | 49.0 | 49.0 | 49.0 | 49.0 |
|---|---|---|---|---|
| Phenoxy PRDA-8080 | 11.9 | 9.8 | 8.2 | 14.0 |
| Estane X-2 | 7.9 | 9.8 | 12.4 | 4.7 |
| Melamine-formaldehyde solution | 2.7 | 2.2 | 1.8 | |
| Urea-formaldehyde solution | | | | 4.1 |
| Methyl ethyl ketone | 39.0 | 39.2 | 38.0 | 38.6 |
| Methyl isobutyl ketone | 9.5 | 11.2 | 12.6 | 6.5 |
| Toluol | 15.5 | 13.8 | 15.0 | 19.2 |
| N-butyl alcohol | 13.5 | 14.0 | 12.0 | 12.9 |
| | 100.0 | 100.0 | 100.0 | 100.0 |
| Doff Post-cure—16-24 hrs. at 70-80° C.: | | | | |
| Resin solution viscosity, initial (cps.) | 410 | 600 | 750 | 275 |
| Resin solution viscosity, 9 days (cps.) | 400 | 600 | | |
| Formula viscosity, initial (cps.) | 3,500 | 2,200 | 3,200 | 2,300 |
| Formula viscosity, 9 days (cps.) | 3,600 | 2,000 | | |
| Phenoxy/estane/urea or melamine formaldehyde | 56/37/7 | 47/47/6 | 38/58/4 | 66/22/12 |

These resins were processed as in Examples 1–4 except that after spooling the coated tape was placed in an oven at 80° C. for 24 hours.

The tape of Example 6 was evaluated with the following results.

PARAMETER

Layer-layer adhesion test _____ Passed.
Surface smoothness—approx. _____ 5 microinch.
1% distortion level (db) [1] _____ +3.0.
Signal-to-noise ratio (db) [1] _____ +2.6.
Saturated output (db) [1] _____ −0.1.
Saturated output, 10 kc. ref. (db) _____ +1.2.
Noise, ±2 kc. Bias (in db): [1]
  15 kc.:
    Bias on _____ +0.6.
    Bias off _____ +1.3.
  150 kc.:
    Bias on _____ −2.3.
    Bias off _____ −0.1.
  1.5 mc.:
    Bias on _____ +3.0.
    Bias off _____ +3.6.
Response (db): [1]
  100 kc. _____ +0.2.
  150 kc. _____ +0.5.
  300 kc. _____ +0.8.
  1.0 mc. _____ −1.0.
  1.2 mc. _____ +0.4.
Resistivity (ohms/sq.) _____ $5.7 \times 10^6$.
Shed, first pass _____ Nil.
B-H Loop:
  $H_{ci}$ _____ 243 Oe.
  $B_{rs}$ _____ 1555 G.
Squareness ratio _____ 0.813.

[1] Indicates comparison with a well-known commercially available wide band instrumentation tape.

What is claimed is:
1. A magnetic recording medium comprising a backing material and an adherent coating thereon, said coating comprising finely divided magnetic particles dispersed in a resinous binder, said binder containing from 25% to 75% by weight of a phenoxy resin of the formula

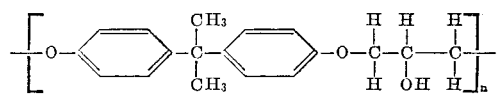

wherein $n$ equals approximately 100 and from 75% to 25% of a polyurethane resin made by reacting a diisocyanate, a dibasic acid and a polyol.

2. The medium of claim 1 wherein the polyurethane resin is made by reacting p,p'-diphenylmethane diisocyanate, adipic acid and butanediol-1,4.

3. The medium of claim 1 wherein about equal parts of the phenoxy and polyurethane resins are employed.

4. A magnetic recording medium comprising a backing material and an adherent coating thereon, said coating comprising finely divided magnetic particles dispersed in a resinous binder, said binder comprising a first resin component containing from 25% to 75% by weight of a phenoxy resin of the formula

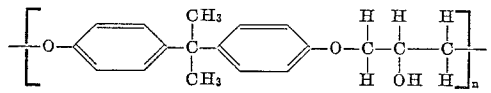

wherein $n$ equals approximately 100 and from 75% to 25% of a polyurethane resin made by reacting a diisocyanate, a dibasic acid and a polyol together with a second resin component selected from the group consisting of melamine-formaldehyde resins and urea-formaldehyde resins and present in a quantity of from 10 to 30% of the phenoxy resin component.

5. The medium of claim 4 wherein the polyurethane resin is made by reacting p,p'-diphenylmethane diisocyanate, adipic acid and butanediol-1,4.

References Cited by the Examiner
UNITED STATES PATENTS

| | | | |
|---|---|---|---|
| 3,109,749 | 11/1963 | Di Ricco | 117—72 |
| 3,136,650 | 6/1964 | Avila | 117—21 |
| 3,144,353 | 8/1964 | Hargis et al. | 117—138.8 |
| 3,148,082 | 9/1964 | Di Ricco et al. | 117—132 |
| 3,177,090 | 4/1965 | Bayes et al. | 117—72 |
| 3,216,846 | 11/1965 | Hendrick et al. | 117—62 |
| 3,238,087 | 3/1966 | Norwalk et al. | 117—75 X |
| 3,245,925 | 4/1966 | Watson | 260—20 |
| 3,247,017 | 4/1966 | Eichler et al. | 117—138.8 |

WILLIAM D. MARTIN, *Primary Examiner.*

W. D. HERRICK, *Assistant Examiner.*

Disclaimer 3,320,090.—*Lawrence Graubart*, Daly City, Calif. PHENOXY-POLYURETHANE MAGNETIC TAPE BINDER. Patent dated May 16, 1967. Disclaimer filed July 11, 1977, by the assignee, *Ampex Corporation*.

Hereby enters this disclaimer to claims 1, 2 and 3 of said patent.

[*Official Gazette September 6, 1977.*]